Sept. 27, 1960            N. C. PRICE            2,953,900
COMBINED OPEN-CYCLE CLOSED-CYCLE POWERPLANT FOR AIRCRAFT
Filed Oct. 10, 1955            6 Sheets-Sheet 1

INVENTOR.
NATHAN C. PRICE
BY
George C. Sullivan
Agent

United States Patent Office 2,953,900
Patented Sept. 27, 1960

2,953,900

COMBINED OPEN-CYCLE CLOSED-CYCLE POWERPLANT FOR AIRCRAFT

Nathan C. Price, Hotel Prince, Luis Moya 12, Mexico City, Mexico

Filed Oct. 10, 1955, Ser. No. 539,606

21 Claims. (Cl. 60—35.6)

This invention relates to vehicular propulsion and relates, more particularly, to a system or mechanism for the propulsion and directional control of aircraft capable of operation or flight from and to small landing areas.

The present invention is concerned, generally, with the propulsion of vehicles, either inhabited or uninhabited, by reactive propulsion engines and by means of which the vehicle may be caused to ascend vertically or at a steep take-off angle, fly or cruise horizontally at high or relatively high translational velocities, and descend or land vertically or at a steep landing angle. During such maneuvers a predetermined amount of boundary layer control effect may be imposed on the aerodynamic upper surface of the aircraft, which is included among the relationships of the invention. Many of the vertical take-off type airplanes currently in experimental operation and heretofore proposed, employ open cycle jet propulsion systems in which one or more high temperature high velocity jets of air and gases of combustion are spouted from propulsive nozzles of large size. Such open cycle jet propulsion systems are productive of very high level sound or noise during take-off and landing as well as in translational flight, the compressors of the powerplants, the high velocity air inlets and other elements of the open cycle, as well as the spouting jets, setting up vibration and sound that is physiologically damaging and almost unbearable to those in the vicinity of the taking-off and landing areas. The comparatively large efflux apertures of such aircraft give rise to noises extending throughout the range of audible frequencies, and are particularly strong in the low frequency range, which is especially capable of transmitting sound a distance of many miles, to disturb inhabitants in an entire urban area. The very high temperature and high velocity propulsive air and gas streams or jets are also dangerous and damaging to personnel and equipment in and adjacent to the landing and take-off zones.

It is an object of this invention to provide an "acoustically silenced" powerplant and/or propulsion system for aircraft intended for vertical, or substantially vertical, take-off and landing, characterized by relatively quiet air inlet means, a silent closed turbo-compressor circuit or cycle, and silenced or quited open circuit compressor discharge means, air heating means, etc. Aircraft operated or propelled with the propulsive system of this invention are productive of much less noise and acoustical disturbance than those driven by conventional jet propulsion systems. The jet efflux noise of the powerplant means or installation of the invention is only a fraction of that produced by conventional jet engines of comparable output, the released energy of noise not exceeding 28% of the energy of noise of such conventional propulsive engines of the same thrust or lift capacity. Furthermore, the relatively small amount of jet efflux noise arising from the propulsive system of the invention lies in the high frequency and inaudible ranges due to use of multiple jet nozzles of small size, and, therefore, rapidly attenuates with distance.

Another object of the invention is to provide a vehicle propulsive system characterized by a combined (1) closed aerodynamic compressor-heater (or heat exchanger)-turbine circuit and (2) an open cycle reactive propulsion circuit having a tubular plenum chamber equipped at its aft end with a directionally controllable nozzle for translational propulsion and with laterally directed nozzles for discharging into a jet pump tube for vertical or substantially vertical ascent and descent of the craft. The closed circuit compressor-turbo unit or rotor is compact and light in weight and yet capable of developing substantial horsepower to drive the ducted compressor of the open circuit at transonic speeds. Thus, in a typical embodiment of the turbine-compressor rotor of the closed circuit weighs about 3.4 lbs. and develops over 1100 shaft horsepower to drive the open circuit ducted compressor through the medium of a planetary speed reducing gear set of special unique design and construction. Thus substantial shaft horsepower is developed by an inherently silent closed circuit to drive the ducted compressor of the open circuit at transonic induction velocity so as to develop a minimum of blading noise at the air inlet. The radiator of the closed circuit is arranged in the path of the air from the ducted compressor of the open circuit to silence the air compressor discharge and the heater of the closed circuit serves to provide positive and yet relatively silent reheat combustion.

It is another object to provide a closed circuit-open circuit reactive propulsion powerplant of the character referred to that is safe to operate, simple and inexpensive to manufacture, and economical in operation. The small light-weight high speed compressor-turbine unirotor of the closed circuit possesses stored kinetic energy only a few percent of that of the compressor and turbine rotors of a conventional powerplant of the same thrust capacity. It is proportioned and designed to resist bursting and is housed within a pressure casing inherently capable of restraining the rotor in the event of rotor burst albeit of very low weight, to protect the other equipment and the craft against direct damage by such a failure. The entire engine or powerplant is light in weight and inexpensive to fabricate since it is constructed, in large measure, of sheet stock and tubing. The high efficiency of the overall system coupled with the ability to employ low grade fuel make operation of the propulsive system both efficient and economical. The powerplant may be operated efficiently with inexpensive furnace oil and comparable liquid hydrocarbons and the combustion organization is not limited to the employment of the more volatile, more expensive fuels. No part of the powerplant of the invention is subjected to the simultaneous effects of high temperature high frequency forces, and corrosive chemical action, such as encountered with turbine blading of conventional open circuit powerplants.

It is another object to provide a closed aerodynamic circuit-open circuit propulsion system in which the plenum chamber, enclosing the closed circuit and its associated combustor, handles a large mass flow of air from the ducted compressor driven by the closed cycle rotor, which air first passes through the radiator of the closed circuit to absorb the heat rejected thereby, sweeps the combustor of the closed circuit and mixes with the flue gases therefrom to reach a temperature of, say, 515° F. and a pressure approaching 2 atmospheres, under sea level static conditions. The air flows internally at an average velocity of approximately 200 ft. per second and finally discharges from the propulsive nozzle at the aft end of the plenum chamber at a jetting velocity of, say, 1350 ft. per second to produce a jet thrust of approximately 1200 lbs. at a weight flow of, say, 28 lbs. per second. It is to be understood that the values just recited are merely typical of a given embodiment and are not intended to be restrictive. For vertical take-off and for landing, and in other cases where vertical thrust is desired, the propulsive nozzle is closed and lateral jet pump nozzles are opened to a vertical jet tube while reheat fuel is injected to burn in a redirected fraction of the ducted compressor air so that fuel burning occurs as this fuel-rich fraction of the heated ducted compressor air stream meets with the major portion of the ducted compressor air flowing into the jet pump tube to furnish ample energy for vertical lift.

Another object is to provide an aircraft propulsion system and installation wherein the main powerplant unit is so arranged and related with respect to the airframe and jet pump to substantially promote overall efficiency during vertical ascent and descent, to reduce the noise level and to increase translational flight efficiency of the craft. The plenum chamber casing is nested in a fore and aft depression or channel in the upper surface of the craft to bridge the upwardly facing bell-mouth entrance of the jet pump tube, to have the air inlet of the open cycle ducted compressor face forwardly and slightly upwardly with respect to the fore and aft neutral axis of the aircraft and to have its propulsive nozzle at or beyond the aft extremity of the craft. The powerplant receiving depression is shaped to direct the cone of noise of the air inlet of the ducted compressor upwardly and forwardly to reduce the apparent sound level and the depression smoothly merges with the bell-mouth of the jet pump tube to reduce the turning losses during induced airflow into the jet pump tube. The nested or partially submerged powerplant blends into the profile of the aircraft to lessen parasitical drag, is readily accessible for inspection and servicing, and is structurally isolated from the aircraft body except for its essential mounts. The directionally controllable propulsive nozzle being at or beyond the rear extremity of the craft provides a large turning moment and may be related to the control surfaces of the aircraft to induce a desirable airflow across these surfaces. The plenum chamber tube has a plurality of jet pump nozzles spouting downwardly into the jet pump tube to induce airflow into this tube for vertical thrust while at the same time creating or promoting a reduced or negative pressure condition at the bell-mouth and adjacent regions of the channel or depression receiving the powerplant, thereby aiding vertical propulsion of the aircraft.

Another object is to provide a propulsion system of this kind wherein the valves controlling the jet pump nozzles, the main propulsive nozzle and the reheat fuel valve are conjointly controlled to readily change over from vertical thrust propulsion to horizontal or translational propulsion. The internal passage of the tubular directional control bulb of the main propulsive nozzle remains open at all times to discharge a reactive jet useful for pitch and turn trimming control and the jet pump exit is provided with valves also operable as vanes for bank control, etc. during vertical take-off and landing.

A further objective of the invention is to provide a system of boundary layer air extraction, active during flight, to increase lifting suction on the upper aerodynamic surface of the aircraft.

A still further object of the invention is to provide a propulsive system of this kind characterized by a semi-toothless planetary gear set drivingly connecting the rotor unit of the closed aerodynamic circuit with the ducted compressor rotor of the open circuit that operates with a minimum of vibration and noise. The gear set provides a substantial speed reduction from the small diametered, high speed unirotor to the compressor rotor and incorporates planet pinions meshing with a segmental ring gear through the medium of small or shallow helical teeth. The several pinions of the set are provided with hub shoulders of true pitch diameters which contact one another and bearing surfaces of the ring gear to form roller bearings and to damp out torsional vibrations. The ring gear being split into segments automatically orients itself with respect to the pitch loads to insure proper meshing engagement of the gear teeth thereby reducing the impact loads and the tooth noise. Under certain conditions of operation the split or segmented ring gear may expand slightly to permit the gear set to operate as an automatic overrunning clutch or as a centrifugal clutch.

Other objectives and features of the invention will become apparent from the following detailed description of a typical preferred form and application of the invention illustrated in the accompanying drawings wherein:

Figure 15 is a diagrammatic view of the control linkage system;

Figures 1, 2, 3, 4:
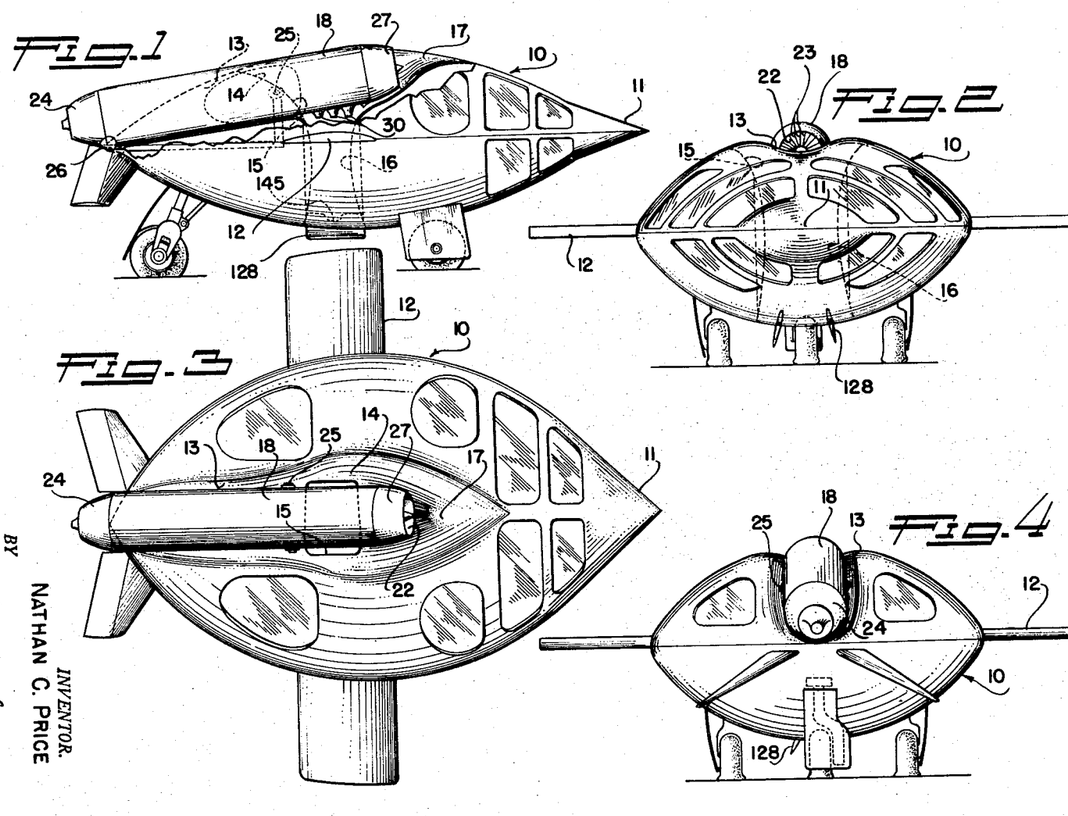
Figure 1 is a side elevation of an aircraft incorporating the present invention with portions broken away to better illustrate the propulsion system installation.
Figure 2 is a front view of the craft.
Figure 3 is a top or plan view of the craft.
Figure 4 is a rear view of the aircraft.

The propulsion system of this invention is, of course, suitable for use for incorporation of craft of various types and configurations and the particular application of the invention illustrated in the drawings is to be understood as exemplary rather than restrictive. The airframe or body 10 of the craft illustrated may be described as discoid in shape, having its skin or outer surfaces generated by arcs symmetrical about the horizontal axis. In plan view the margins of the fuselage or body 10 curve inwardly and forwardly to a pointed forward end 11, and curve inwardly and aft toward a somewhat less pointed aft end. It will be observed the discoid fuselage or body 10 has a large planform area to possess substantial aerodynamic sustentation in level flight and, therefore, the craft requires wings 12 of only limited dimensions if wings are, in fact, required. The top or upper surface of the body 10 has a central fore and aft channel or elongate depression 13 to receive the powerplant described below. This elongate depression 13 extends from the aft end of the body 10 to a point some distance forwardly of the central vertical axis of the craft. As best seen in Figures 3 and 4 of the drawings, the walls of the depression 13 smoothly merge with or join the adjacent surfaces of the body 10 and a substantial region of the depression aft of its forward extremity is flared to form the upper portions of what I will term the bell-mouth 14 of a generally vertical jet pump passage or tube 15. This tube 15 extends downwardly from the depression 13 to the underside of the body 10. As best illustrated in Figure 1 and Figure 2, the bell-mouth 14 of the jet pump tube 15 converges downwardly to a throat 16 and the walls of the tube gradually diverge downwardly from this throat to the exit of the tube to the end that the tube is substantially venturi shape. Since the bell-mouth 14 is spaced aft of the forward extremity of the elongate depression 13 there is what may be termed a rounded shoulder 17 where the bell-mouth and depression merge near the forward end of the depression.

The powerplant proper has an elongate tubular or hollow casing 18 which may be cylindrical for the major portion of its length. This casing 18 defines or provides the above mentioned plenum chamber 20, serves to enclose the several primary elements of the closed circuit means 21, carries the air inlet 22 in which a ducted compressor 23 operates and carries or includes the main propulsive nozzle 24. As illustrated in the drawings, the casing 18 is arranged longitudinally in the above described depression 13 in the top of the craft body 10 to have the air inlet 22 adjacent and slightly aft of the shoulder 17 which is of gentle curvature, and to present the propulsive nozzle 24 at or aft of the pointed rear end of the body. Further, it will be observed the casing 18 may preferably be substantially submerged or contained in the depression 13 to the end that the exterior of its periphery is generally coincident with or tangent to continuations of the upper surface arcs of the body 10, at least throughout a substantial portion of the length of the casing. In Figures 1 to 4 inclusive, it will be observed that the central longitudinal axis of the depression 13 and the central fore and aft axis of the casing 18 are pitched or inclined upwardly and forwardly with respect to the central fore and aft axis of the body 10. The purpose and advantages of this disposition of the powerplant casing will be described later. Where the craft is equipped with a single propulsive system the longitudinal axis of the casing 18 preferably intersects the central vertical axis of the body 10 and the fore and aft location of the casing 18 is such that it bridges or extends across the upper end of the jet pump tube 15 and its bell-mouth 14. The aircraft just described forms the subject matter of my divisional co-pending application Serial Number 717,282, filed February 12, 1958.

While it is contemplated that the powerplant casing 18 may be supported or mounted in any selected or appropriate manner, it will usually be preferred to support the casing in spaced relationship with the walls of the depression 13 to mechanically and thermally isolate the powerplant from the body 10 so far as practically possible and to expedite airflow into the jet pump tube 15 during vertical propulsion phases. Accordingly, I have shown two front engine mounts 25 at diametrically opposite sides of the casing 18 slightly aft of the jet pump tube 15. These mounts 25 are in the nature of pivotal connections supporting the powerplant on an axis normal to the longitudinal axis of the casing 18. The engine mounting means further includes a rear mount 26 at the aft end of the casing 18 adjacent the nozzle 24 and having slotted or lost motion engagement with the body 10 to permit differential thermal expansion and contraction of the casing and body. The mounts 25 and 26 support the casing 18 in the depression 13 in a manner to leave a relatively narrow continuous space between the external surface of the casing and the wall of the depression 13 to allow a free movement of insulating and isolating air therebetween.

The air inlet 22 at the forward end of the casing 18 includes an annular or tubular cowling 27. The cowling 27 is hollow, having an outer wall converging forwardly from the casing 18 and having an inner wall turned or converging inwardly and aft from the forward extremity of the cowling to define the convergent air receiving mouth of the inlet. Just aft of this rearwardly convergent mouth the internal wall of the inlet 22 is shielded by laminated coiled armor strip 28, preferably of soft stainless steel having a very high elongation characteristic, presenting a cylindrical tubular duct region in which the compressor 23 rotates to charge the plenum chamber 20 with compressed air. Aft of this cylindrical duct region the cowling 27 flares or diverges toward the internal wall of the casing 18.

The above mentioned propulsive nozzle 24 is in the nature of a rearwardly convergent tubular aft portion or extension of the casing 18. The nozzle 24 serves to discharge or spout a relatively low velocity large mass flow of relatively low temperature heated air and combustion gases from the plenum chamber 20 for the translational propulsion of the vehicle. As will be described below, the nozzle 24 is obstructed when vertical propulsive thrust is desired or required so as to divert the major portion of the propulsive air and gas stream to the jet pump tube 15. The plenum chamber casing 18 is provided with a plurality of jet pump nozzles 30 discharging into the bell-mouth 14 and upper end of the jet pump tube 15. These nozzles 30 are designed to discharge relatively high temperature air and gas streams or jets at high jetting velocities to bring about an efficient jet pump effect and thereby obtain a substantial vertical thrust sufficient to propel the vehicle vertically for vertical or substantially vertical take-off and to sustain the vehicle for controlled slow vertical or substantially vertical landing.

Figure 5:
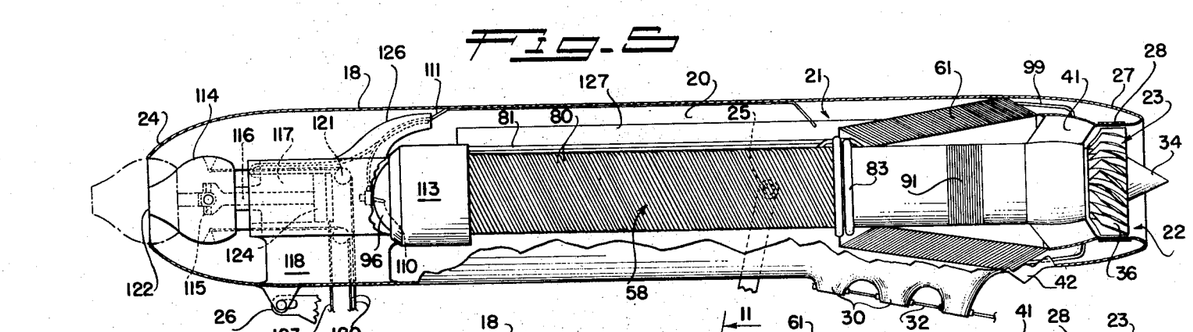
Figure 5 is an enlarged longitudinal sectional view of the major portion of the powerplant means with certain elements appearing in side elevation.
Figure 6:
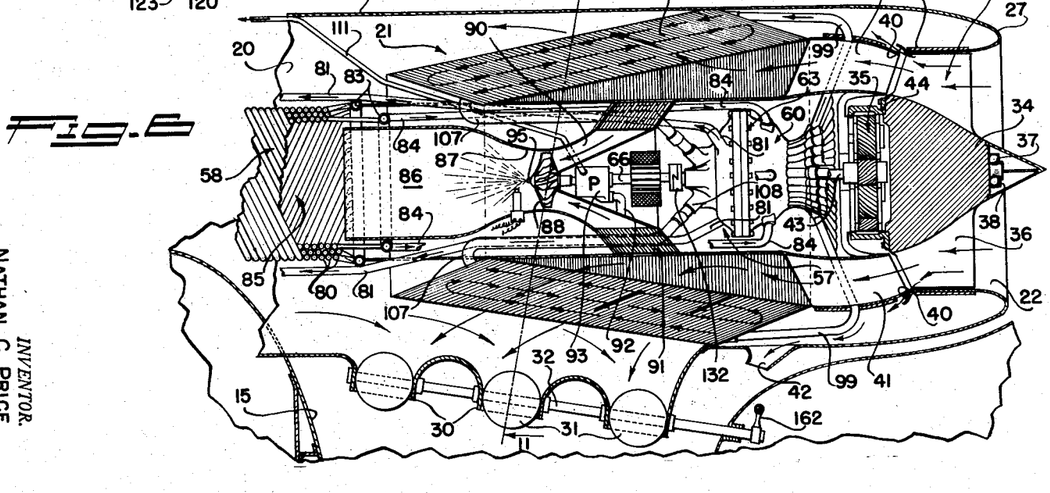
Figure 6 is an enlarged vertical sectional view of the forward portion of the powerplant means shown in Figure 5.
Figures 11, 12, 13, 14:
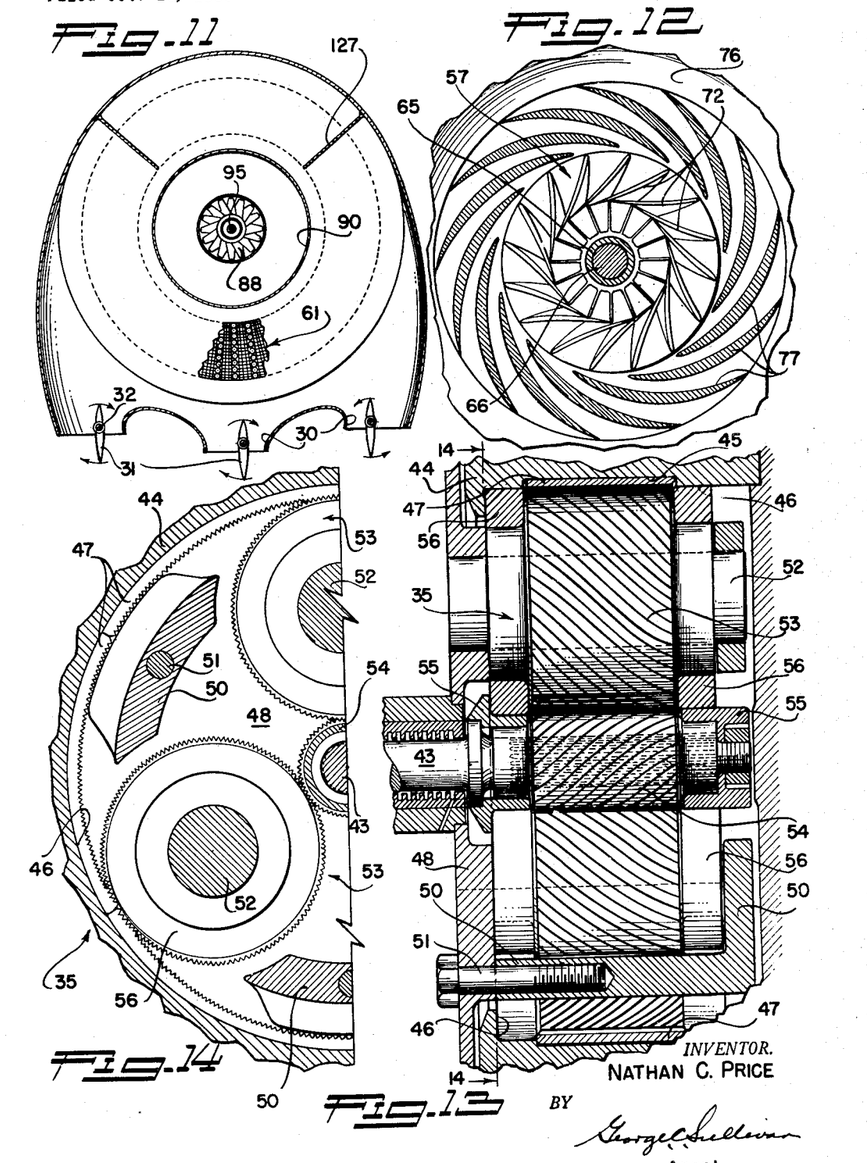
Figure 11 is a substantially vertical sectional view taken as indicated by line 11—11 on Figure 6.
Figure 12 is a front or end view of the rotor and stationary diffuser vanes or airfoils of the closed circuit compressor.
Figure 13 is an enlarged radial sectional view of the speed reducing gear set with certain elements appearing in side elevation.
Figure 14 is a transverse sectional view of the gear set with certain parts appearing in end view.

As best illustrated in Figures 5, 6 and 11, there is a series of jet pump nozzles 30 on the underside of the casing 18 directed downwardly and slightly to the rear in the downwardly convergent mouth of the jet pump tube 15. The plurality of relatively small jets issuing from the nozzles 30 in the entrance of the jet pump tube greatly increase the air mixing shear area, thereby permitting the employment of a shorter jet pump tube, and jet boundary discontinuities are restrained to small distances. The shorter jet pump tube in turn provides reduced wall friction losses and provides more uniform outlet or jetting conditions. Furthermore, the numerous small nozzles 30 produce efflux noise of relatively high frequency, or in the inaudible range, the former being muffled in the jet pump tube. Such noise as does escape is of high frequency, and therefore highly directional, which prevents noise from being spread over large areas. The angular direction of the nozzles 30 reduces the turning losses of the large volume or flow of ducted compressor air diverted to the jet pump tube 15, as will be apparent. The jet pump nozzles 30 themselves provide a multiplicity of spaced downwardly convergent jetting openings, each of which is equipped with a butterfly valve 31. The valves 31 are carried by shafts 32 to be movable in unison between closed positions where they close off their respective nozzles 30, during translational propulsion of the vehicle, and open positions where they form "throats" in the nozzles 31 to assist in bringing the flow therethrough to the supersonic regime. It can be provided, if desired, that one or more nozzles always remain open, to furnish some jet tube induced flow, for continuous boundary layer extraction during level flight. The valves 31 are airfoil shape in cross section and when their airfoil configurations are axially aligned with the passages through the nozzles 30 they provide the nozzles with effective throats of convergent-divergent configuration to assist in bringing about the supersonic flow just mentioned. Furthermore, the trailing downwardly convergent surfaces of the open butterfly valves present or form thrust surfaces in the jet pump nozzles themselves to impart or assume a vertical lift to the vehicle at the nozzles.

Figures 16, 17, 18:
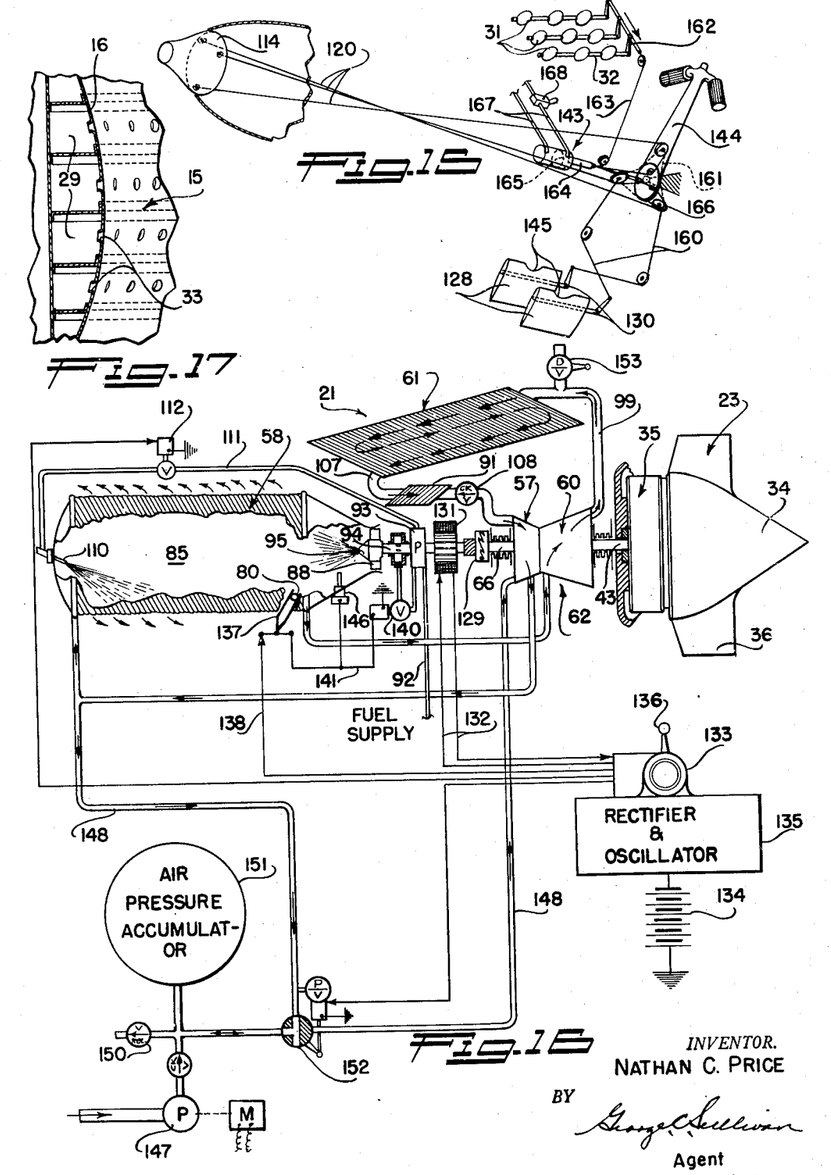
Figure 16 is a schematic diagram of the populsion system.
Figure 17 is an enlarged fragmentary sectional view of the perforated walls of the jet pump tube.

The walls of the jet pump tube 15 may be perforated, as shown at 33, for acoustical silencing or damping, the perforations leading to closed cells 29 or chambers in the structure of the tube and, if desired, the rear portion of the plenum chamber 20 or of the nozzle bulb may be perforated in a similar manner for the same purpose. In this connection it may be observed that while the free velocity of the air and gas stream at the throat of the jet pump tube is high, the relative velocity between the air and gas streams is moderate, and the velocity at the exit of the tube is considerably reduced, by intermediate recompression in the jet tube, thus lessening the sound or noise output externally. The detailed operation of the jet pump means of the open circuit including the suction or reduced pressure action at the bell-mouth 14 and adjacent regions, will be more fully described in connection with the overall operation of the propulsive system.

The ducted compressor 23 supplies the plenum chamber 20 with compressed air which receives heat energy from the closed circuit system 21 to discharge from the nozzle 24 and jet pump tube 15 as a reactive propulsion jet stream. The compressor includes a tapered or pointed hub 34 of duraluminum or other suitable material. The rotor or hub 34 is supported or journaled for rotation in the air inlet 22 by a planetary gear set 35 for transmitting rotation of the the rotor. The gear set 35 is at the inner or aft end of the hub 34 and the tapering hub is provided ahead of the gear set with a row of airfoil-shaped blades 36. The blades 36 are preferably hollow and formed of age-hardening Monel sheet stock, or the like, and have beaded inner ends cast or embedded in the metal hub 34. The set of blades 36 operates within the above described generally cylindrical inlet region defined by the armor strip 28, having suitable tip clearance with the wall of the inlet. A stator vane assembly 41 is provided in the flaring diffuser region of the inlet 22 behind the rotor 34 and its blades 36. The compressor rotor 34 is dynamically balanced by two free metal balls 37 operating in an annular raceway 38 adjacent the periphery of the tapering forward portion of the rotor. The airfoils or blades 36 are cambered and deep or broad and act as centrifugal separators to eject foreign matter from the air stream. The invention provides an annular bleed slot 40 in the wall of the air inlet 22 immediately ahead of the stator blades or vanes 41 to receive this ejected material. The slot 40 leads to the interior of the cowling 27 and the cowling, in turn, is provided at its underside and exterior with an outlet 42 to discharge the bleed air and foreign matter overboard. The compressed air bled through the cowling 27 is at a sufficiently high temperature to prevent icing of the surfaces of air inlet 22.

The elements of the engine or powerplant thus far described are primarily components of the open cycle or circuit of the propulsive system and the gear set 35, which will now be described, forms or provides a driving mechanical connection between the above mentioned closed aerodynamic circuit means 21 and the ducted compressor 23 of the open circuit. The gear set 35, which is a planetary speed reducing mechanism, is designed to provide a substantial speed reduction between the high velocity power output shaft 43 of the closed powerplant circuit 21 and the hub or rotor 34 of the ducted compressor. In addition, the gear set 35 operates as a journal means or bearing type support for the compressor to facilitate quick starting of the powerplant. It is a feature of the invention that the gear set 35 is especially quiet in operation, damping or absorbing torsional vibration and constructed so that its gears operate under very low impact loads.

The gear set 35 includes a ring 44 of steel, or the equivalent, fixed to the aft end of the compressor rotor 34 to transmit rotation thereto. The ring 44 has an internal annular groove 45 and annular internal bearing or journal surfaces 46 at the sides of the groove. A ring gear 47, of aluminum bronze, or the equivalent, freely seats in and cooperates with the groove 45 of the ring. The ring gear 47 comprises a plurality of segments, say six substantially equal segments, which may be chamfered or beveled to some extent at their adjoining axial edges. The gear set further includes a stationary drum 48 and guide shoes 50 secured to the drum by pivot pins or bolts 51 to be engageable by the segments of the ring gear 47 to hold the latter against displacement when the mechanism is idle. The relatively stationary drum 48 carries at least three circumferentially spaced axial subshafts 52 which journal or support planet gears or pinions 53. These pinions 53 mesh with a sun-gear 54, splined or otherwise secured on the high velocity output shaft 43, and with the ring gear 47. The ring gear 47, planet gears 53 and sun gear 54, have small or shallow helical teeth. Journal rings 55 are hand pressed on the hubs of the sun gear 54, and similar but larger diametered rings 56 are very lightly hand pressed on the ends of the hubs of each planet pinion 53 to be capable of microscopic movements on the hubs. The rings 56 of the planet gears ride or roll on the rings 55 of the sun gear 54 and also engage or roll on the internal surfaces 46 of the surrounding ring 44. Thus the rings 55 and 56 bearing one on the other, and the rings 56 bearing on the surfaces 46 of the relatively unyielding ring 44, act as roller bearings for the gear set and serve to damp out torsional vibration. The microscopic slippages at both peripheries and bores of the rings 56 absorb energy during any tendency for vibrational resonance. The gear set, as illustrated and described, having the small shallow gear teeth and the mating rolling rings 55, 56 and the surfaces 46, is a "semi-toothless" gear mechanism. In this mechanism the sectional or segmental ring gear 47 operates to provide an automatic centrifugal clutch action by expanding fractional thousandths of an inch, compressing the oil film, under centrifugal force occuring as rotative speed of the driving pinions increases above idling speed, the pitch line of the ring gear increasing slightly in diameter. This is desirable and important in facilitating the quick starting and acceleration of the propulsion system and in reducing fuel consumption by permitting idling speed of the powerplant to be substantially lower. Under the idling condition the described clutch slips considerably, so that the ducted compressor 23 rotor drifts at very low speed absorbing a negligible amount of power, yet sufficiently ventilating the radiator 61 and plenum tube interior. During operation of the propulsion system the segmental ring gear 47 is free to orient itself perfectly with respect to the imposed pitch loads to bring about substantially ideal meshing cooperation of the teeth of the ring gear and the planet gears 53, this self-orienting feature materially reduces tooth contact noise and the impact loads on the teeth. The helical angle of the gear teeth is selected to substantially balance thrust between the ducted compressor and the unirotor.

The closed circuit 21 of the propulsive system is a silent compressor-turbo power generating organization for driving the ducted compressor 23 through the medium of the gear set 35 and incorporates relatively silent heater and radiator features which add heat and energy to the propulsive air stream flowing through the plenum chamber 20 for exhaust from the nozzle 24. The closed circuit 21 is also operable to introduce fuel into the compressed air stream to obtain positive and relatively silent reheat combustion for vertical thrust operations. The circuit 21 is a continuous flow system including a compressor 57, a heater 58 for heating the air or fluid compressed by the compressor, a turbine 60 driven by the compressed heated air and a heat exchanger or radiator 61 for rejecting residual heat from the circulating air prior to reintroduction into the compressor 57. In the preferred construction the blading of the compressor 57 and turbine 60 are parts of or incorporated in a single rotor which I will term a "unirotor" 62. The several elements just mentioned of the closed circuit 21, as well as certain auxiliaries and devices associated therewith, are contained and spaced in the casing 18, being in the form of a compact elongated cylindrical assembly extending aft from the gear set 35 in spaced generally concentric relation with the internal walls of the casing.

Figure 10:
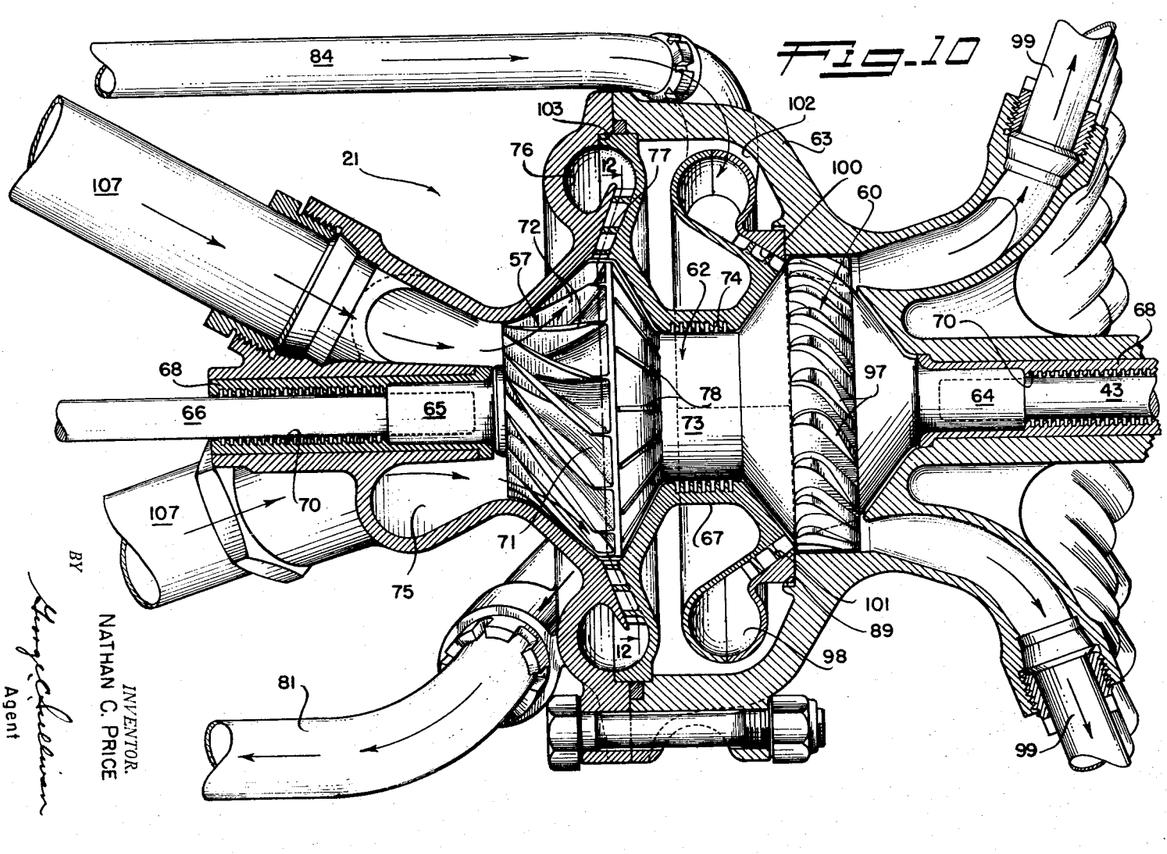
Figure 10 is an enlarged longitudinal sectional view of the turbo-compressor mechanism and related elements of the closed circuit.

The compressor-turbine unirotor 62 is a small lightweight member, preferably of one-piece construction of "Inconel X," or the like, which can be electronically machined by automation, since only approximately two cubic inches of material are required to be removed between the vanes and buckets. It is designed for high speed operation, being adapted in a typical embodiment of the invention to turn at a speed of from 170,000 to 185,000 r.p.m. The unirotor 62 is housed and journaled in a pressure-casing 63 just aft of the gear set 35. The opposite ends of the unirotor 62 have stub-shafts 64 and 65 of reduced diameter. The forward stub-shaft 64 is coupled with the shaft 43 of the sun gear 54 and the aft stub-shaft 65 is coupled with an auxiliary drive shaft 66. The above mentioned pressure-casing 63 is spaced around the unirotor to accommodate the rotor blading and a nozzle box 67. Mating centralizing shoulders 89 are provided at the forward end of the nozzle box 67 and the interior of the casing 63 and have limited radial clearance when cold to permit relative thermal expansion of the box and casing. The opposite end portions of the casing 63 carry axially split bearing and sealing bushings 68. The interiors of these bushings 68 are provided with multiplicities of labyrinth seal grooves 70 for reducing the leakage of the closed circuit pressure air to a minimum. The cylindrical bearing surfaces adjoining these labyrinth grooves 70 journal the unirotor 62 and the shafts 43, 64 and 65. The journals or bearing surfaces may be lubricated by the dense compressed working air of the closed circuit or, if desired, may be lubricated with occasional injections of light oil and molybdenum bisulphide. The bushings 68 and other rotation assuming bearing elements of the high velocity compressor-turbo unit may preferably be constructed of selected ceramels or ceramics which will not gauld against the shafts.

The compressor means 57 of the closed circuit 21 comprises the compressor rotor end or portion of the unirotor 62, hereinafter referred to as the compressor rotor 71, and a row of blading 72 thereon. The compressor rotor 71 is in the nature of an annular enlargement on the aft portion of the unirotor 62. The rotor 71, which is of mixed axial-radial flow form, has a major aft surface sloping or curving radially outward and forwardly from adjacent the aft hub of the unirotor to a peripheral cylindrical land and the compressor blading 72 is provided on this surface. The forward surface of the rotor 71 slopes sharply inwardly from this land to an intermediate shaft or bearing portion 73 of reduced diameter of the unirotor. This portion 73 of the unirotor 62 is housed with slight radial clearance in the nozzle box 67. In practice, it is desirable to provide labyrinth seal grooves 74 in the nozzle box 67 at the intermediate portion of the unirotor to reduce pressure leakage between the compressor and turbine 60. The blades 72 of the compressor 57 are mixed radial and axial flow vanes of true high speed airfoil configuration, preferably of biconvex form with relatively sharp leading and trailing edges unlike the flat plates used for vanes in conventional radial-flow compressors. These blades 72, which operate in the pressure casing 63 with slight tip clearance, are axially or longitudinally twisted or contoured to have an entrance angle of about 30° at the periphery of the leading edge, and a backward sloping exit angle of about 20° from a radial plane congruent with the unirotor axis.

The compressor entrance portion of the casing 63 has an annular passage 75 receiving the closed circuit air from the radiator 61 which passage forms the inlet of the mixed flow high velocity compressor 57. The casing 63 is also provided with a compressor outlet scroll or manifold space 76 and a series of stationary diffuser vanes 77 is provided in the entrance of this manifold. As illustrated in Figure 12, these diffuser vanes 77, which may be formed on the nozzle box 67 of the casing, are high speed airfoils of small camber and substantial chord. In a typical embodiment of the invention the compressor 57 of the closed circuit 21 receives air from the radiator 61 at a pressure of about 625 pounds per square inch while the discharge pressure of the compressor is about 5,100 pounds per square inch. The high pressure air from the compressor 57, about one sixth the density of water, is supplied to the heater 58 of the closed circuit, as described below. A plurality of lands or ribs 78 is provided on the steep forward face of the compressor rotor 71 and operate in the cavity of the nozzle box 67 with slight clearance, tending to equalize pressures between the compressor gap and the turbine gap, while allowing a slight controlled leakage of relatively cool air to occur from the compressor to the rear surface of the turbine 60.

Figure 8:
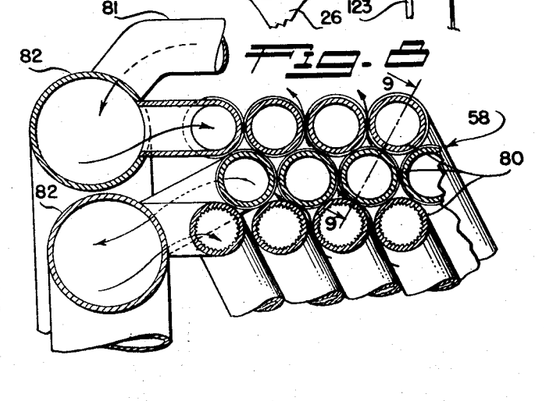
Figure 8 is an enlarged fragmentary longitudinal section of the heater tube arrangement.
Figure 9:
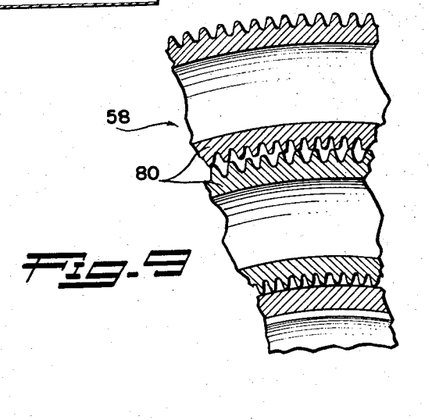
Figure 9 is an enlarged fragmentary transverse sectional view of the heater tubes.

The heater 58 of the closed circuit 21 serves to heat the highly compressed and therefore dense air continuously discharging from the compressor 57 for subsequent delivery to and driving of the turbine 60. The heater includes two, three or more layers of slightly helical heater tubes or coils 80 which together form a porous walled tubular unit or assembly spaced some distance aft of the compressor-turbine means 57—60 and preferably coaxially positioned in the plenum chamber 20 in spaced relation to the walls thereof. The compressed air from the compressor discharge scroll 76 is conducted aft by one or more pipes 81 to an annular manifold 82 at the rear end of the heater 58. An outer series or set of the helical tubes 80 has one end in communication with the manifold 82 to receive the air therefrom. A manifold 83 at the front end of the heater 58 receives the air from the outer set of tubes 80 and transfers it to an intermediate series of tubes to flow aft therethrough to the manifold 82 where the air again reverses for forward flow through the inner layer or row of helical tubes 80 to the forward manifold 83. One or more pipes 84 carry the heated compressed air to the turbine 60. The tubes 80 of the adjacent rows or tubular series of tubes are closely nested to reduce to a minimum the spaces between the tubes to tortuous narrow channels which are effective sound absorbers. It is preferred to extend the surfaces of the tubes 80 to aid the transfer of heat from the air and combustion gases of the heater to the compressed air flowing through the tubes. This may be done by internally "rifling" or fluting the internal surfaces of the tubes, or some of them, and/or finning or ridging the external surfaces of some or all of the tubes. It will usually be preferred to internally flute the tubes 80 of the inner row or layer to keep the metal temperature from greatly exceeding the contained air flow's temperature at the heater outlet, and to externally fin or ridge the tubes of the outer rows, the fins or ridges serving to separate the adjacent nested tubes, thus leaving small air paths therebetween of reduced capacity. The surface configurations and relationships of the tubes 80 are illustrated in Figures 8 and 9.

The nested layers of tubes 80 define or provide a combustion space 85 that is elongate and cylindrical. The forward end of this space 85 is extended by a combustor shell 86 having a forward end converging to a venturi-like throat 87. A blower 88 is provided in this throat and is driven by the auxiliary drive shaft 66 of the unirotor 62. An annular rearwardly and inwardly directed passage 90 leads from adjacent but aft of the ducted compressor diffuser vanes 41 to the blower 88 and combustor shell 86. The blower 88 draws a relatively small portion of the ducted compressor air, say one tenth, to the combustor space to provide an air-fuel ratio of about 15/1 and it is preferred to pre-heat this air prior to introduction to the combustor. The combustion air may be preheated by a relatively small radiator or heat exchanger 91 associated with the above-described pipes 84 and pipes 107 and disposed at the entrance of the air passage 90. The fuel for the heater 58 is supplied by a fuel line 92 extending to a pump 93. The pump 93, preferably of the centrifugal type, is driven by the auxiliary shaft 66 and delivers fuel to the tubular shaft 94 of the blower 88 for discharge from a nozzle 95 on the aft end of the shaft. The blower 88, aided by the rotating nozzle 95, creates a free vortex of combustion of flame at very high temperature in the fuel spray envelope or shell 86 and in the main combustor space defined by the series of nested helical tubes 80. A substantial part of the heat transfer from flame to tubes is accomplished by radiation. The aft end of this main combustor space is substantially closed by a dished plate or cap 96 which may be associated with the aft manifold 82. The free vortex of flame advances rearwardly in the combustor and the hot combustion gases seep through or between the closely nested series of slightly helical tubes 80 to join and mingle with the large mass flow of propulsive air moving aft in the plenum chamber 20. In this connection it should be noted there is an efficient transfer of heat from the combustion gases and air distributed along the entire series of tubes 80 as they escape or seep therebetween in intimate contact with the tubes having the external ribs to extend their surfaces, promoting such exchange of heat to the compressed air of the closed circuit 21. The heater 58 is substantially silent since the combustion therein is very uniform and evenly distributed within the series of closely nested tubes 80. It should also be noted the heater tubes 80, carrying the highly compressed air of the closed circuit 21, are arranged so that the coolest combustion gases are at the coolest portion of the closed circuit tubes while the hottest combustion gases act on the hotter tubes 80 of the closed circuit, thus providing a "counter flow" action.

The highly compressed heated air is conducted from the heater 58 to the turbine 60 to energize or drive the same, passing through the pipes 84 to the turbine of the closed circuit organization. It should be observed that the heater 58, while operating primarily and efficiently to heat the working fluid or air of the closed circuit 21, also expels the flue gases to the propulsive air stream of the open circuit flowing through the plenum chamber 20, thereby increasing the overall efficiency of the powerplant. This heating of the air in the outside or open circuit results from the direct submersion of the heater 58 in the air stream flowing through the plenum chamber 20 so that not only is heat recovered from the combustion gases and air seeping between the tubes 80 but any unavoidably released radiant heat from the external surfaces is also absorbed by the ducted compressor air moving aft through the plenum chamber for propulsive discharge from the nozzle 24. The dense compressed air of the closed circuit flowing from the heater reaches the static inlet of the turbine 60 at a temperature of about 1780° F. and a pressure of about 5,000 pounds per square inch and is approximately one-tenth the density of water.

The turbine 60 is the forward portion of the unirotor 62 and operates or rotates in the pressure casing-nozzle box assembly 63—67. It includes a row of buckets 97 and the partial reaction, axial flow type and slightly inward radial flow on the periphery of the enlarged forward portion of the unirotor. In the embodiment of the invention heretofore mentioned, the diameter of the bladed turbine 60 is less than 3 inches. The buckets 97 are airfoil shaped in cross section and design so that the entrance angle of the spaces or passages between them is about 60° to a transverse plane and the buckets have tapering tails providing the passages therebetween with exits having an angle of about 30°. The relative velocity of the working air at the entrances of the revolving turbine buckets 97 is subsonic and the air is accelerated by the reaction expansion in the turbine to a supersonic velocity. Thus the relative velocity of the air at the entrances of the buckets may be about 1100 ft. per second, at the throats of the buckets or bucket passages the relative velocity will be about 1900 ft. per second, and at the outlets of the turbine bucket passages the relative velocity of the working air is about 2400 ft. per second. The stream temperature entering the revolving buckets may be about 1200° F., and leaving the buckets, about 800° F. The nozzle box 67 has a scroll 98 into which the pipes 84 discharge the heated compressed working air and a reduced annular nozzle passage 100 leads from the scroll to spout the working air against the turbine buckets 97. This stationary entrance nozzle 100 is provided with a multiplicity of supersonic nozzle vanes 101 arranged with a discharge angle of about 20° to a transverse plane. The working air is supplied to the entrance of the nozzle 100 at a temperature of about 1780° F. and a pressure of about 5000 pounds per square inch. The Reynolds' criterion at the throat of the nozzle ring 100 will be 2,060,000, slightly lower at the exit of the nozzle ring, about 1,170,000 at the entrances of the turbine buckets 97, and 1,420,000 at the outlet of the revolving turbine. These high Reynolds' numbers are extremely significant since they positively indicate thin boundary layers and high blading efficiency as in open cycle turbines many times as large, and this also allows substantial changes in the desired or required operating conditions with maintained high efficiency under varying circumstances. A plurality, say 24, pipes 99 lead from the outlet or exit of the turbine means through the hollow diffuser vanes 41 to the radiator 61.

The nozzle box 67 is spaced within the pressure casing 63 at and adjacent the turbine inlet scroll 98 and the forward face of the compressor rotor 71 to surround the same as well as the intermediate portion 73 of the unirotor 62. The nozzle box 67 is spaced from the inner walls of the pressure casing 63 to leave a heat insulating space 102 which, if desired, may contain a selected thermal insulating material. The nozzle box 67 is split or divided both axially and diametrically to facilitate its assembly in the pressure casing 63 and is retained and pressure sealed in the casing at mating shouldered regions 103. It will be noted that the nozzle box, the only part of the turbine exposed to high stream temperature, is free to expand differentially without buckling. The pressure casing 63 is designed, proportioned and constructed to safely absorb without failure the dynamic energy of the rotor 62 in the event the latter bursts or fails, it being understood the unirotor itself is designed and stressed to resist failure and bursting, even when operated at angular velocities far beyond normal operating speeds. The stored kinetic energy of the unirotor has an equivalent of about 90 British thermal units, not exceeding one-tenth that of an open cycle turbine of the same power.

The nozzle vanes 101 in the turbine nozzle ring may be of substantially the same shape as the buckets 97 with the leading edge quarter portions removed and the nozzle vanes possess an exit angled about 20° instead of the 30° exit angle of the revolving buckets.

Figure 7:
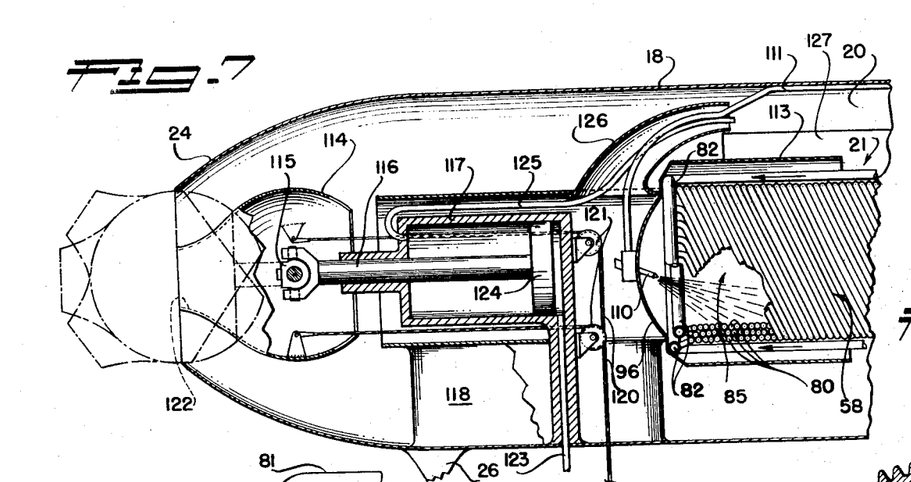
Figure 7 is an enlarged longitudinal sectional view of the aft portion of the powerplant means, the broken lines showing the "closed" position of the nozzle bulb.
Figure 7A:
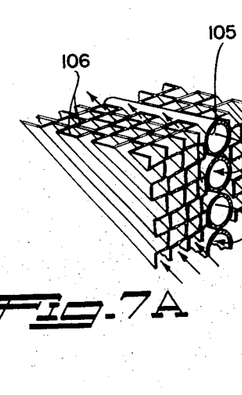
Figure 7A is an enlarged fragmentary sectional view of the radiator.

The radiator 61 is provided to reject heat from the turbine discharge air of the closed circuit 21 to the ducted compressor air flowing in the plenum chamber 20 and thus prepare or cool the closed circuit air for recompression by the compressor 57. The heat rejected by the radiator 61 is, of course, transferred to the ducted compressor air and is thus recovered or utilized by the propulsive open circuit system of the invention. The heat exchanger or radiator 61 is an annular or tubular frusto conical unit positioned in the plenum chamber 20 in the region between the diffuser blades 41 of the ducted compressor 23 and the forward end of the combustor or heater 58. In accordance with the broader aspects of the invention any selected or suitable type of radiator or heat exchanger may be employed, it being preferred, however, to utilize a radiator that will hold the air turning frictional losses to a minimum. For example, the radiator 61 may be similar to the heat exchanger or intercooler disclosed in my earlier Patent No. 2,575,683, issued November 20, 1951, but reinforced for the very high pressures of containment. The forward end of the radiator receives the closed circuit air from the turbine discharge pipes 99 which may pass through the diffuser vanes 41 of the ducted compressor and then through the cowling 27 to discharge into the multi-tube core of the radiator. The radiator, as shown, comprises a plurality of layers of tubes 105 and an extended surface matrix 106 associated with the tubes. The flow pores of the matrix 106 slope at an acute angle to the plenum tube axis, to minimize turning losses, and increase in cross section area in the direction of flow, furnishing a diffusion. The proportions of the pores can be established to damp out the predominant ducted compressor sound. The aft end of the radiator 61 discharges into the pipes 107 leading to the inlet passage 75 of the compressor 57. As above described, the heat exchanger 91 is associated with the pipes 107 to further reject heat from the closed circuit air before it is returned to the compressor 57. In the specific embodiment of the invention hereinabove referred to, the main radiator 61 serves to reject 6,300,000 B.t.u. per hour to the ducted compressor air flowing in the plenum chamber 20. Prior to this the ducted compressor 23 has supplied 2,800,000 B.t.u. per hour of heat of compression to the plenum chamber air. After this air passes through the main radiator 61 it mixes with the combustion gases and air from the heater 58 and is heated as it sweeps around and past the heater to reach a temperature of 515° F. prior to discharge from the propulsive nozzle 24. Check valve means 108 is provided between the main radiator 61 or the supplemental heat exchanger 91, and the compressor 57 to prevent reverse flow of the closed circuit working air, that is flow from the compressor directly to the radiator, when the unirotor is to be started by externally furnished compressed air.

Due to the very high pressures in the closed aerodynamic circuit, very high rates of heat transfer are obtained with very low frictional pressure losses.

The open and closed powerplant circuits are further operatively inter-related, especially during vertical propulsion phases of operation. This is effected by a "reheat action" in the heater 58 and plenum chamber 20, coupled with closure of the propulsive nozzle 24 so that additional energy is imparted to the ducted compressor air diverted to the jet pump tube 15 to increase the jet pump action. The reheat means includes a fuel nozzle or injector 110 protruding forwardly from the abovementioned aft cap 96 of the closed combustor. A pipe 111, leading from the fuel pump 93, supplies liquid fuel to the injector 110 under the control of a valve 112. The injector 110 sprays fuel forwardly and downwardly in the aft portion of the combustor space to produce an overrich fuel-air mixture. The reheat or afterburner means further includes a muff 113 spaced around the aft portion of the combustor or heater tubes 80. The aft end of the upper portion of the muff 113 is closed for about 90° of its circumferential extent. The over-rich fuel-air mixture created when fuel is injected from the nozzle 110 enters the muff 113 and burns with approximately 25% of the ducted compressor air as it flows beneath the heater 58 toward the jet pump nozzles 30.

In order that the major portion, say 90%, of the ducted compressor air may be diverted for discharge through the jet pump nozzles 30, I provide means for closing or restricting the propulsive nozzle 24. An axially movable tubular bulb 114 is supported for movement between a position forward and clear of the nozzle 24 and a "closed position" where it engages in and restricts the nozzle. The bulb 114 is supported on the rear end of a rod 116 by a universal joint 115 and the rod enters a cylinder 117. The cylinder 117, the muff 113, the aft manifold 82, and other adjacent equipment are supported on one or more hollow streamlined struts 118 on the casing 18. Flexible control elements in the form of chains or cables 120, or the equivalent, extend through the struts 118, are guided over sprockets 121 and are secured to the interior of the hollow or tubular bulb 114 at angularly spaced points. The tubular bulb 114 has a rearwardly convergent nozzle opening 122 which discharges a reactive stream or jet of air under pressure. By differentially operating the cables 120, the nozzle bulb 114 can be moved through a conical angle of 70° or more so that this jet of compressed air may be utilized to obtain a trimming action or pitch or turn control. It should be observed that the substantially spherical bulb 114 is free to move angularly in the main propulsive nozzle 24 also when the bulb is in its closed position essentially seated in the mouth of the main nozzle.

The nozzle bulb 114 is pressure balanced to facilitate its ready operation without involving heavy tension in control connections thereto. The pressure balancing means includes the above mentioned cylinder 117 and a piston 124 on the rod 116 for operating in the cylinder. A vent line 123 maintains the forward end of the cylinder 117 in communication with the atmosphere. A pressure line 125 communicates with the aft end of the cylinder 117 and extends to a convenient source of air pressure so as to impose super atmospheric pressure on the aft side of the piston 123 and thus bias the nozzle bulb 114 toward its open position. This facilitates movement of the bulb 114 from the closed position to the open position. In practice, the line 125 may have its outer end open to the plenum chamber 20 or other region of relatively cool fluid under pressure. Since flow conditions in the nozzle 24 tend to urge the bulb 114 to the closed position, there is no necessity to bias the bulb toward the closed position. An air scoop or blast tube 126 is associated with the pressure balancing means just described to direct relatively cool plenum chamber air against the nozzle bulb actuating and balancing mechanisms. The blast tube 126 has its entrance adjacent the periphery of the plenum tube 20 and faces forwardly to receive the ducted compressor air essentially free of flue gas, flowing through the chamber. The tube 126 discharges inwardly and rearwardly against the cylinder 117, the chains 120, the sprockets 121, etc. to prevent this equipment from becoming excessively hot. The above mentioned fuel pipe 111, leading to the reheat fuel injector 110, may pass longitudinally through the blast tube 126.

As best illustrated in Figure 11, two circumferentially spaced longitudinal septa 127 are provided in the plenum chamber 20 to assure the flow of approximately 25% of the ducted compressor air to the rear end of the heater 58. The septa 127 are radially disposed in the chamber 20 and extend between the casing 18 and the heater tube assembly 80. In addition to directing a substantial minor percentage of the ducted compressor air to the rear of the heater, the septa 127 cause relatively cool air to reach the blast tube 126, it being understood that the primary purpose of the septa is the appropriate distribution of air along the elongate heater's exterior for both translational propulsion and vertical propulsion output. The over-rich fuel-air mixture produced when fuel is injected from the injector 110 enters the muff 113 and burns in approximately 25% of the ducted compressor air diverted from the septa 127 to flow beneath the heater 58 toward the jet pump tube 115. Final burning and mixing occurs as this minor stream meets and mixes with the air moving directly from the radiator core 106 to the jet pump nozzles 30. The gas flow at the nozzles 30 will total about 26 lbs. per second, producing a jet velocity of about 2300 ft. per second inasmuch as the gases discharge into a depressed region of the jet pump tube because the flow velocity of entrained air at the throat of the jet pump tube is approximately sonic, or 1000 ft. per second. This, in turn, will produce a jet net thrust of about 1700 lbs. with the temperature at 1520° F. Assuming the efficiency of the jet pump to be 40% the conditions in the vertical lift tube will be substantially as follows:

Total gas and air flow 115 lbs. per second, a jet discharge velocity of 635 ft. per second, a stream temperature of 400° F. and a thrust output of 2,280 lbs. The re-compression ratio between the throat and exit of the jet pump amounts to about 1.9 to 1.

Since the inducted air flow is in the ratio or amount of 3.5 times the jet nozzle flow the jet pump effects over 33% increase in lift. The bulb 114 of the rear propulsive nozzle 24 may be directed at an angle of 60° to the ground with the bulb in the closed position. The jet opening 122 of the bulb 114, directed in this manner, discharges 10% of the ducted compressor air flow at the same velocity and temperature as the rear main propulsive nozzle to add 100 lbs. upward thrust, providing a total lifting force of 2,380 lbs.

The jet pump tube 15 is provided with one or more valves 128 adapted to close or be closed during translational flight and capable of being set or directed for banking control during vertical flight. I have shown two companion valves 128 of airfoil or stream-lined cross section carried by or fixed to fore and aft shafts 130. The valves 128 are preferably unbalanced, that is their axes of pivotal movement are unequally spaced between their fore and aft or upper and lower edges so as to automatically open when the air and gas flows downwardly through the jet tube 15 and to automatically close during translational flight of the vehicle. A releasable or normally free control system is provided to direct the valves 128 for the purpose of banking control or trimming during vertical or substantially vertical flight. This control includes crossed cables 160 operatively connected at one end with the valves 128. The cables 160 have their other ends connected with lever horns 161 on the mono manual lever 144.

While it is contemplated that any selected or required powerplant control system may be employed, I prefer to utilize a speed responsive governor means for maintaining the rotative speed of the revolving elements of the powerplant at a given value or within a selected range, primarily by regulation of pressure level of the closed aerodynamic circuit and, secondarily by a temperature responsive means for maintaining a constant high or maximum temperature in the closed system or cycle. Thus the control serves to prevent over-speeding by regulating the pressure level of the closed aerodynamic circuit 21. It is to be understood the combination of the closed and open circuits 20 and 21 with the jet pump means may be controlled in other manners.

The illustrated control system includes a motor generator 131 driven by the auxiliary drive shaft 66. It is preferred to interpose an overrunning clutch 129 between the rear shaft 65 of the unirotor 62 and the auxiliary drive shaft 66 or to provide such an overrunning clutch forward of the motor generator 131. A circuit 132 extends from the motor generator 131 to a speed governor 133 responsive to current alternation frequency. A storage battery 134 is connected with the governor 133 and the circuit 132 through the medium of a rectifier-oscillator 135 and is adapted to provide a potential to the motor generator 131 for engine starting purposes. The governor 133 is provided with a manual lever or throttle control 136 so that the pilot or engineer may assume control of the powerplant operation by re-setting the governor. The control system further includes a thermostat 137 arranged to have its thermistor or temperature responsive element in the forward portion of the heater 58. The thermostat 137 is of the electrically regulable type and a circuit 138 extends from the governor 133 to the thermostat to regulate the same in response to current alternation frequency provided by the motor generator 131. The thermostat 137 in turn controls a main fuel control valve 140 connected in the fuel line 92, there being a control circuit 141 extending from the thermostat to the electrically operable valve 140. With the arrangement just described the temperature setting of the thermostat 137 is determined by the speed of rotation of the unirotor 62 through the medium of the motor generator 131 and governor 133 and the flow setting or position of the valve 140 is determined by the temperature setting of the thermostat and the temperature conditions in the heater 58. With this type of control the internal pressure ratios and temperatures of the closed circuit 21 will remain substantially the same at various altitudes of flight and in practice the relationship of elements may be such that the internal pressure ratios and temperatures of the closed circuit remain the same as at sea level under various conditions of flight operation. Thus it is estimated that during translational flight at 520 M.P.H. at an altitude of between 15,000 ft. to 20,000 ft. the ducted compressor flow will be about 21.3 lbs. of air per second, which is approximately 76% of the ducted compressor air flow at sea level, so that the pressure level of the closed aerodynamic circuit 21 must be reduced by the governor's control to about 76% of that obtaining during flight at or near seal level, the air weight flow in the closed aerodynamic circuit being also about 76%, and the fuel flow from the injector or nozzle 95 being also about 76% of that obtaining during sea level flight.

The butterfly valves 31 of the jet pump nozzles 30 and the bulb 114 of the main propulsive nozzle 24 are preferably interconnected for simultaneous control or operation. I have shown a suitable mechanical linkage 143 between the shafts 32 of the butterfly valves and the chains 120 of the nozzle. This linkage is operable by the manual lever 144 between a position where the bulb 114 is forward or open and the valves 31 are closed, and a second position where the bulb 114 is closed and the valves 31 are open. The operative connection between the valve shafts 32 and the nozzle bulb 114 includes levers 162 on the valve shafts and a cable 163 connected with the levers and extending to a piston 164 operating in a cylinder 165. The above described cables or chains 120 connected with the interior of the nozzle bulb 114 operate over pulleys 166 on three equally spaced lever horns 161 on the manual control lever 144, and also have their ends connected with the piston 164. Air pressure lines 167 supply operating pressure to the opposite ends of the cylinder 165. A manual valve 168, preferably of the push-button type, is operable to charge one end of the cylinder 165 with air pressure to simultaneously pull the three cables 120 and thus move the nozzle bulb 114 to the "open" position. The cable 163 is pulled simultaneously with the cables 120 to close the jet tube valves 32. This conditions the powerplant for level flight operations. Air pressure supplied to the opposite end of the cylinder 165 relaxes tension on the cables 120 and the bulb 114 moves to the closed position in the nozzle by air flow therethrough and tension on the cable 163 is simultaneously relaxed so that pressure from the plenum chamber moves the valve 31 to their open positions. This conditions the propulsive system for vertical or substantially vertical flight operations.

If desired, the above described unbalanced valves 128, adjacent the exit of the jet pump tube 15, may have semi-circular cut-outs or openings 145 opposite one or more of the jet nozzles of the plenum tube being left open; to discharge a limited stream of ducted compressor air for boundary layer air extraction from the airplane's upper surface during level or translational flight when all other valves associated with the jet tube are closed, it being understood that these openings are optional and may be omitted if desired. It is obvious that the bell-mouth of the jet tube may optionally be faired to the external air stream, if desired, by sliding sheets of metal, or the equivalent.

A fuel igniter 146 is provided in the heater 58 in front of the fuel injector 95. The igniter 146 may be electrically energized by the control circuit 141.

Working fluid or compressed air leakage from the closed circuit powerplant 21 occurs at the labyrinth seals 70 at a comparatively slow rate. To replace this leakage loss an outside pump 147 may be provided and a pressure make-up pipe 148 extends from the pump to the inlet of the compressor 57. The make-up pipe 148 may be controlled by a pressure responsive or pop-off valve 150.

For engine starting purposes a source of air under pressure, such as a pressure accumulator 151, is adapted to be connected with the pipe 148 by opening a valve 152 so that air under pressure is supplied to the compressor to drive the unirotor 62 and thus initiate rotation of the unirotor and facilitate starting of the closed circuit powerplant 21. A dump valve 153 is connected in one of the pipes leading from the turbine 60 to the radiator 61 and is adapted to be manually opened for power-off landings on air pressure supplied from the accumulator 151 or other available source of air or chemically produced hot gases, such as decomposed hydrogen peroxide, under pressure and for immediate restarting purposes. The accumulator 151 may be charged with air under pressure by positioning the valve 152 to provide for the delivery of air under pressure from the pump 147 to the accumulator and at the same time to close off the pipe 148 to the compressor 57. It is to be understood that other means may be utilized for starting the closed circuit powerplant 21, for example mobile ground installations incorporating proper pressure sources may be used.

In the operation of the propulsion system the powerplant may be started by introducing air under pressure to the compressor 57 from the accumulator 151, as just described. The manual control lever 136 may adjust the governor to initiate and establish the starting pressure conditions in the closed circuit 21 and when the powerplant is in operation the lever may be moved to bring the powerplant up to normal or maximum operating conditions. Assuming the aircraft to be on a field or take-off station, it may be desired to operate the craft substantially vertically from the station. The propulsive system is conditioned for this action by simultaneously closing the nozzle bulb 114 and opening the jet pump nozzles 30 in the manner described above. At the same time, the valve 112 is open to provide for the discharge of re-heat fuel from the injector 110. The manual lever 144 is operated to set the nozzle bulb 114 in a suitable trim position or may be operated to move the bulb during vertical ascent, the lever 144 also being operable to set or adjust jet tube valves 128 for banking purposes. In this connection it should be noted that the 120° spacing of the horn levers 161 provides for this "differential" or directional control of the bulb 114 and valves 128. With the jet pump tube 15 open and the jet pump nozzles 30 discharging downwardly into the tube, the air and combustion gases jetted from the nozzles mix with inducted outside air entering through the bell-mouth 14 to create a strong negative pressure or suction at the top of the fuselage 10. This negative pressure is increased by the immediately adjacent air inlet 22 of the plenum chamber 20, augmenting the vertical lift effect of the jet pump. With the jet pump in operation substantially 90% of the ducted compressor air flow is directed through the spaced jet pump nozzles 30 to produce a highly efficient jet pump action. Re-heat fuel at the rate of, say, 1950 pounds per hour is injected from the injector 110 in the aft end of the heater 58 producing an over-rich fuel-air mixture which enters the muff 113 to burn with about 25% of the ducted compressor air as it flows beneath the heater toward the jet pump nozzles. Final mixing and burning occur as the over-rich mixture meets the outside air moving directly from the radiator matrix 106 to the jet pump nozzles 30. Under a typical vertical ascent condition the gas flow through these nozzles will be about 26 pounds per second at a velocity of 2300 feet per second, producing a jet net thrust of 1700 pounds. Assuming the efficiency of the jet pump to be approximately 40%, the total gas and air flow through the vertical jet lift tube 15 will be 115 pounds per second at an outlet jetting velocity of 635 feet per second, producing a thrust of 2,380 pounds. It should be noted that the valves 31 in the jet pump nozzles form throats and the mixed air and combustion gas jets become supersonic as they pass the valve throat restriction and approach the depression at the throat of the jet pump tube. The plurality of relatively small jet nozzles bring about an increased mixing shear area in the jet pump tube, allowing the tube to be made relatively short with proportionately less wall friction loss and with a more uniform outlet condition.

When sufficient altitude has been obtained the propulsion system may be readily conditioned for translational flight by moving the lever 144 to simultaneously open the propulsive nozzle bulb 114 and to close the jet pump nozzles 30. The re-heat fuel valve 112 is closed and the manual throttle lever 136 may be operated to provide for the selected or required horizontal flight velocity. With the jet pump tube 15 closed, the entire mass flow of ducted compressor air flows aft through the plenum chamber, absorbing heat energy at the radiator 61 and heater 58, to discharge from the nozzle 24 as a propulsive jet. The high velocity unirotor 62 of the closed circuit 21 transmits substantial shaft horsepower, say, 1100 horsepower, to the ducted compressor 23 through the medium of the planetary gear set 35, the ducted compressor thus driven serves to propel or move a large mass flow of compressed air through the plenum chamber 20 at a relatively slow velocity.

For vertical or substantially vertical descent, the powerplant system is conditioned as above described for the vertical ascent so that the jet pump tube 15 acts to provide a substantial vertical lift augmented or assisted by the negative pressure condition in the bell-mouth region.

Having described only typical forms of the invention I do not wish to be limited to the specific details herein set forth, but wish to reserve to myself any variations or modifications that may appear to those skilled in the art and fall within the scope of the following claims.

I claim:

1. Propulsive means for aircraft and the like comprising an elongated casing having a ram inlet at its forward end and a propulsive nozzle at its aft end, a ducted compressor operable in the inlet to produce a flow of air rearwardly through the casing, a complete closed cycle turbo-compressor powerplant spaced within the casing including rotor means, a drive between the rotor means and ducted compressor whereby said powerplant drives the compressor, a combustion heater means within the casing adding heat energy to both said casing airflow and said closed cycle turbo-compressor powerplant and a heat exchanger means positioned in the airflow through the casing and interposed in the closed cycle powerplant system between the turbine and compressor for rejection of heat from the closed cycle system.

2. Propulsive means for aircraft and the like comprising an elongated casing having a ram inlet at its forward end and a propulsive nozzle at its aft end, an open cycle flow system in the casing from the inlet to the nozzle, a ducted compressor operable in the inlet to produce a flow of air rearwardly through the casing, the casing, compressor and nozzle comprising an open cycle propulsive powerplant system, a complete closed circuit aerodynamic powerplant spaced within the casing in the open cycle flow system including turbine-compressor rotor means, a combustion heater means interposed in the open cycle flow system for heating both the actuating fluid of the closed circuit powerplant and the open cycle airflow, a radiator positioned in the open cycle flow system and interposed in the closed circuit powerplant system between the turbine and compressor for rejection of heat from the closed circuit system, and a drive from the rotor means of the closed circuit powerplant to the ducted compressor whereby the closed circuit powerplant drives the compressor.

3. Propulsive means for aircraft and the like comprising an elongated casing having a ram inlet at its forward end and a propulsive nozzle at its aft end, an open cycle flow system in the casing from the inlet to the nozzle, a ducted compressor operable in the inlet to produce a flow of air rearwardly through the casing, the casing, compressor and nozzle comprising an open cycle propulsive powerplant system, a complete closed circuit aerodynamic powerplant spaced within the casing in the open cycle flow system including turbine-compressor rotor means, a combustion heater in the open cycle flow system and interposed in the closed circuit powerplant system between the compressor and turbine of said rotor means, said heater heating both the open cycle air flowing through the casing and the fluid in the closed circuit powerplant system, a radiator in the flow system and interposed in the closed circuit powerplant system between the turbine and compressor of the rotor means, the radiator heating the open cycle air flowing through the casing, and a drive between the rotor means and the ducted compressor of the open cycle.

4. Propulsive means for aircraft and the like comprising an elongated casing having a ram inlet at its forward end and a propulsive nozzle at its aft end, an open cycle flow system through the casing from the inlet to the nozzle, a ducted compressor operable in the inlet to produce a flow of air rearwardly through the casing, the casing, compressor and nozzle comprising an open cycle propulsive powerplant system, a closed circuit aerodynamic powerplant spaced in the open cycle flow system within the casing including turbine-compressor rotor means, a fuel consuming heater in the open cycle flow system and interposed in the closed circuit powerplant system between the compressor and turbine of said rotor means, said heater heating both the open cycle air flowing through the casing and the fluid in the closed circuit powerplant system, a radiator in the open cycle flow system and interposed in the closed circuit powerplant system between the turbine and compressor of the rotor means, the radiator heating the open cycle air flowing through the casing, and a speed reducing clutch drive between the rotor means and the ducted compressor of the open cycle.

5. Propulsive means for aircraft and the like comprising an elongated casing having a ram inlet at its forward end and a propulsive nozzle at its aft end, an open cycle flow system through the casing from the inlet to the nozzle, a ducted compressor operable in the inlet to produce a flow of air rearwardly through the casing, the casing, compressor and nozzle comprising an open cycle propulsive powerplant system, a closed circuit aerodynamic powerplant spaced in the open cycle flow system within the casing including turbine-compressor rotor means, a heater in the open cycle flow system and interposed in the closed circuit powerplant system for heating the actuating fluid of the closed circuit powerplant and the open cycle air flowing through the casing, the heater comprising tubes spaced and arranged to define a combustion chamber, said tubes constituting fluid conductors of a portion of the closed circuit powerplant system, fuel injecting means in the chamber, the combustion gases passing between the tubes to the propulsive nozzle whereby the fluid of the closed circuit powerplant system is energized by heat transferred from the combustion gases through the tube walls to the fluid as the combustion gases pass between the tubes to the propulsive nozzle, a radiator interposed in the closed circuit powerplant system between the turbine and compressor of said rotor means and arranged in the path of the open cycle air flowing through the casing to transfer heat thereto, and a drive between the rotor means of the closed circuit powerplant and the ducted compressor whereby the closed circuit powerplant drives the ducted compressor.

6. A propulsion system for aircraft comprising an elongated plenum chamber having an air inlet at its forward end, a propulsive nozzle at its aft end, a ducted compressor operable in the chamber to move a stream of air through the chamber for propulsive discharge from the nozzle, a closed cycle turbo-compressor powerplant within the chamber for driving the compressor, a combustion heater means within the chamber adding heat energy to both said propulsive air stream and said closed cycle turbo-compressor powerplant, and a radiator positioned in the air stream path and interposed in the closed cycle powerplant system between the turbine and compressor for transfer of heat from the closed cycle system to the air stream.

7. A propulsion system for aircraft comprising an elongated plenum chamber having an air inlet at its forward end, a propulsive nozzle at its aft end, a ducted compressor operable in the chamber to move a stream of air through the chamber for propulsive discharge from the nozzle, a closed cycle turbo-compressor powerplant within the chamber for driving the compressor, the closed cycle powerplant including a means for heating the closed cycle powerplant fluid by combusting a portion of the compressed air flowing through the chamber, the combustion gases passing through the propulsive nozzle with the balance of the compressed air after heating the closed cycle powerplant fluid, and a cooling means in the closed cycle powerplant system for rejection of heat therefrom.

8. A propulsion system for aircraft comprising an elongated plenum chamber having an air inlet at its forward end, a propulsive nozzle at its aft end, a ducted compressor operable in the chamber to move a stream of air through the chamber for propulsive discharge from the nozzle, a closed cycle turbo-compressor powerplant within the chamber for driving the compressor, the closed cycle powerplant including a means for heating the closed cycle powerplant fluid by combusting a portion of the compressed air flowing through the chamber, the combustion gases passing through the propulsive nozzle with the balance of the compressed air after heating the closed cycle powerplant fluid, and a radiator in the path of the compressed airflow through the chamber transferring heat thereto.

9. A propulsion system for aircraft comprising an elongated plenum chamber having an air inlet at its forward end and a propulsive nozzle at its aft end, a ducted compressor operable in the chamber to move a stream of air through the chamber for propulsive discharge from the nozzle, a closed cycle turbo-compressor powerplant within the chamber to be swept by the air flowing therethrough and including a closed operating fluid flow system wholly contained within the chamber, heater tubes interposed in said system and spaced one from the other, fuel burner means providing a region of combustion combusting a portion of said stream of air at the tubes and heating the closed cycle operating fluid, the combustion gases passing through the propulsive nozzle with the balance of the compressed air, a radiator positioned in the air stream and interposed in the closed cycle powerplant system between the turbine and compressor for rejection of heat from the closed cycle system to the air stream, a rotor in the closed cycle turbo-compressor powerplant driven by said operating fluid, and a driving connection between the rotor and ducted compressor whereby the closed cycle turbo-compressor powerplant drives the compressor.

10. A propulsion system for aircraft comprising an elongated plenum chamber having an air inlet at its forward end and a propulsive nozzle at its aft end, a ducted compressor operable in the chamber to move a stream of air through the chamber for propulsive discharge from the nozzle, a closed cycle turbo-compressor powerplant spaced within the chamber to be swept by the air flowing through the chamber, said closed cycle turbo-compressor powerplant including a closed cycle operating fluid flow system, heater tubes in said operating fluid flow system and spaced one from the other, a fuel burner means providing a region of combustion combusting a portion of said air stream adjacent the tubes whereby the gases of combustion pass between the tubes into the balance of said stream of air through the chamber, a radiator in the operating fluid flow system located in the path of said stream of air through the chamber transferring heat from said operating fluid to the said stream of air, a rotor in said closed cycle turbo-compressor powerplant driven by said operating fluid, and a driving connection between the rotor and ducted compressor whereby the closed cycle turbo-compressor powerplant drives the compressor.

11. In a propulsive powerplant the combination of; a compressor and a turbine rotating as a unit, a closed cycle working fluid conducting system receiving compressed fluid from the compressor and delivering heated compressed fluid to the turbine to drive the same, a heater comprising at least one tube in said system shaped and arranged to define a combustion space thereby, means for injecting fuel into said space to burn therein, the heated working fluid from said heater tube flowing to the turbine, a radiator in said closed cycle system between the exit of the turbine and entrance of the compressor, and a propulsive compressor means driven by said rotating unit and moving a stream of air through the radiator and past the heater, a portion of said air stream mixing with the fuel in the heater for said burning therein.

12. In a propulsive powerplant the combination; a compressor and a turbine rotating as a unit, a closed cycle working fluid conducting system receiving compressed fluid from the compressor and delivering heated compressed fluid to the turbine to drive the same, a heater comprising spiralled tubes interposed in said system with their convolutions in closely spaced relation and arranged to define a combustion space thereby, means for injecting fuel into said space to burn therein, the heated working fluid from said heater tubes flowing to the turbine, a radiator in said closed cycle system between the exit of the turbine and entrance of the compressor, and a propulsive compressor means driven by said rotating unit and moving a stream of air through the radiator and past the heater, a portion of said air stream mixing with the fuel in the heater for said burning therein.

13. In a propulsive powerplant the combination of; a compressor and a turbine rotating as a unit, a closed cycle working fluid conducting system receiving compressed fluid from the compressor and delivering heated compressed fluid to the turbine to drive the same, a heater comprising a plurality of spiralled tubes interposed in series relation in the said system with their convolutions in adjacent spaced relation and arranged to define a combustion space thereby, means for injecting fuel into said space to burn therein, the heated working fluid from said heater tubes flowing to the turbine, a radiator in said closed cycle system between the exit of the turbine and entrance of the compressor, and a propulsive compressor means driven by said rotating unit and moving a stream of air through the radiator and past the heater, a portion of said air stream mixing with the fuel in the heater for said burning therein.

14. In a propulsive powerplant the combination of; a compressor and a turbine rotating as a unit, a closed cycle working fluid conducting system receiving compressed fluid from the compressor and delivering heated compressed fluid to the turbine to drive the same, a heater comprising a plurality of serially connected spiralled tubes interposed in said system with convolutions of each spiralled tube in closely spaced relation and with the convolutions of one tube in nested relation to the convolutions of the other tubes, the spiralled tubes being shaped and arranged to define a combustion space thereby, means for injecting fuel into said space to burn therein, the heated working fluid from said heater tubes flowing to the turbine, a radiator in said closed cycle system between the exit of the turbine and entrance of the compressor, and a propulsive compressor means driven by said rotating unit and moving a stream of air through the radiator and past the heater, a portion of said air stream mixing with the fuel in the heater for said burning therein.

15. In a propulsive powerplant the combination of; a closed cycle working fluid conducting system, a compressor for compressing the fluid in the closed cycle system, a combustion heater for heating the compressed fluid, a turbine driven by the compressed heated fluid and driving the compressor, and an annular radiator in said system receiving the efflux of the turbine and discharging cooled fluid into the compressor; and an open cycle circuit comprising a tube having an air inlet at one end and a propulsive nozzle at the other end with a ducted compressor in the tube driven by the turbine to move air through the tube, said raiator being within the tube to be cooled by the air flowing therethrough, a portion of said airflow through the tube being combustion air in said heater for heating the closed cycle compressed fluid.

16. In a propulsive powerplant the combination of; a closed cycle working fluid conducting system, a compressor for compressing the fluid in the closed cycle system, a combustion heater for heating the compressed fluid, a turbine driven by the compressed heated fluid and driving the compressor, an annular radiator in said system receiving the efflux of the turbine and discharging cooled fluid into the compressor, and an open cycle circuit comprising a tube having an air inlet at one end and a propulsive nozzle at the other end with a ducted compressor in the tube driven by the turbine to move air through the tube, said radiator being within the tube to be cooled by the air flowing therethrough and being spaced around the turbine and compressor, a portion of said airflow through the tube being combusion air in said heater for heating the closed cycle compressed fluid.

17. In a propulsive powerplant the combination of; a closed cycle working fluid conducting system, a compressor for compressing the fluid in the closed cycle system, a combustion heater for heating the compressed fluid, a turbine driven by the compressed heated fluid and driving the compressor, an annular radiator in said system receiving the efflux of the turbine and discharging cooled fluid into the compressor, and an open cycle circuit comprising a tube having an air inlet at one end and a propulsive nozzle at the other end with a ducted compressor in the tube driven by the turbine to move air through the tube, said radiator being within the tube to be cooled by the air flowing therethrough and including heat-transfer fins sloping aft and radially outward with respect to the long axis of the tube, a portion of said airflow through the tube being combustion air in said heater for heating the closed cycle compressed fluid, said closed cycle system wholly contained within said open cycle tube.

18. In a propulsion system for aircraft the combination comprising an elongated plenum chamber having an air inlet at its forward end and a propulsive nozzle at its aft end, a ducted compressor operable in the chamber to move a stream of air through the chamber for propulsive discharge from the nozzle, a closed cycle turbo-compressor powerplant in the chamber driving a shaft, a fuel consuming heater in the chamber combusting a portion of the ar stream to add heat energy to the closed cycle powerplant as well as to the propulsive air stream through the chamber, a radiator means interposed in the closed cycle powerplant system for transfer of heat therefrom to the air stream, and a speed reduction drive connected to both the shaft and compressor and including speed responsive means providing an increasingly positive driving engagement as the speed of the shaft increases.

19. In a propulsive powerplant the combination of; a compressor and a turbine rotating as a unit, a closed cycle working fluid conducting system receiving compressed fluid from the compressor and delivering heated compressed fluid to the turbine to drive the same, a heat exchanger means interposed in the closed cycle system between the turbine and compressor, a heater comprising at least one spiral tube having its convolutions in closely spaced relation and defining a combustion chamber space, a ducted compressor driven by the compressor-turbine unit supplying air for combustion to said combustion space, said combustion air passing through said heat exchanger means for cooling said closed cycle working fluid, means injecting fuel into the space for combustion therein, and a blower in the fore part of said combustion space driven by said unit to circulate combustion air ambient to said closed cycle system through said space, the air and combustion gases seeping between said convolutions in escaping from said space.

20. In a propulsive powerplant the combination of; a compressor and a turbine rotating as a unit, a closed cycle working fluid conducting system receiving compressed fluid from the compressor and delivering heated compressed fluid to the turbine to drive the same, a heat exchanger means interposed in the closed cycle system between the turbine and compressor, heater coil means interposed in said system forming a combustion region, a ducted compressor driven by the compressor-turbine unit supplying air to said combustion region, said combustion air passing through said heat exchanger means for cooling said closed cycle working fluid, a blower within the fore part of said combustion region driven by the compressor-turbine unit and circulating the flow of combustion air to said region, and an injector discharging fuel into said region, the heated closed cycle working fluid flowing from the heater coil means to the turbine to drive the same.

21. In a propulsive powerplant the combination of; a compressor and a turbine rotating as a unit, a closed cycle working fluid conducting system receiving compressed fluid from the compressor and delivering heated compressed fluid to the turbine to drive the same, heat exchanger means interposed in the closed cycle system between the turbine and compressor, heater coil means interposed in said system forming a combustion region, a ducted compressor driven by the compressor-turbine unit supplying air to said combustion region, said combustion air passing through said heat exchanger means for cooling said closed cycle working fluid, a blower within the fore part of said combustion region driven by the compressor-turbine unit and circulating the flow of combustion air to said region, and an injector rotating with the blower and discharging fuel into said region, the heated closed cycle working fluid flowing from the heater coil means to the turbine to drive the same.

References Cited in the file of this patent

UNITED STATES PATENTS

| | | |
|---|---|---|
| Re. 23,198 | Anxionnaz et al. | Feb. 21, 1950 |
| 784,285 | Sturtevant et al. | Mar. 7, 1905 |
| 1,585,281 | Craddock | May 18, 1926 |
| 2,172,910 | Keller | Sept. 12, 1939 |
| 2,233,031 | Price | Feb. 25, 1941 |
| 2,319,149 | Micuta | May 11, 1943 |
| 2,404,954 | Godsey | July 30, 1946 |
| 2,444,318 | Warner | June 29, 1948 |
| 2,453,928 | Oeschslin | Nov. 16, 1948 |
| 2,600,302 | Kinsella | June 10, 1952 |
| 2,604,277 | Anxionnaz et al. | July 22, 1952 |
| 2,820,599 | Ackeret et al. | Jan. 21, 1958 |